ित3,104,068
PROCESS FOR PREPARING ULTRADISPERSED PASTES AND POWDERS OF INSOLUBLE ORGANIC PIGMENTS AND DYES
Paolo Castelli, Cesano Maderno, and Alberto Sonz, Milan, Italy, assignors to Montecatini Società Generale per l'Industria Mineraria e Chimica, Milan, Italy
No Drawing. Filed Feb. 29, 1960, Ser. No. 11,470
Claims priority, application Italy Mar. 2, 1959
13 Claims. (Cl. 241—16)

This invention is directed to a process for preparing water-insoluble organic pigments and dyes in the form of ultradispersed pastes and powders.

The development of the so called "continuous" dyeing process, with the resulting relative technical and economical advantages offered to the dyeing industry, was chiefly due to the possibility of reaching a high degree of subdivision of the insoluble dyes. However, the "continuous" dyeing process also presented certain inconveniences and disadvantages which limited its effectiveness.

One of the most serious inconveniences has been the settling of the aqueous suspension of the dye or pigment as sediment. This sedimentation did not permit uniform distribution of the dye on the fabric. It was therefore thought necessary to carry out the dyeing at comparatively high temperatures (of the order of 60–90° C.) in order to obtain good penetration of the pigment in the fabric. However, such higher dyeing temperatures frequently had a deleterious effect on the thermal resistance of the dyes or on the behavior of the fibres as a consequence of their different natures, origins, and finishing treatments.

Attempts were made to avoid or at least reduce the sedimentation of the aqueous dye suspension by increasing the viscosity of the aqueous suspensions. However, the elimination of the above-cited inconveniences presented by the continuous dyeing process was successful only when insoluble dye and pigment pastes and powders, consisting of uniformly small particles, were placed on the market.

Various processes are known for producing insoluble dyes in the form of uniformly small particles including dry, wet or paste grinding. Among these various grinding methods, wet grinding is the most advantageous due to the simplicity of the apparatus required and also to the relatively low working cost.

However, wet grinding has presented a number of difficult problems to solve in order to improve and assure the uniformity of the final result. This also depends upon the nature of the treated dye or pigment.

Wet grinding requires "grinding means," which grinding means must possess certain properties, so that under the action of mechanical means these grinding means will receive an impulse sufficient to mince or subdivide the particles to be ground. Accordingly, these grinding means must possess a number of characteristics upon which characteristics the desired final size of the dye and its degree of uniformity chiefly depend. Important characteristics include hardness, elasticity, tenacity, specific gravity, shape, etc.

Of course, processes are already known whose object is the reduction, down to the desired size, of the crystalline particles of which the insoluble organic dyes and pigments consist. Such processes are generally based upon acid treatment, dry grinding with various mechanical apparatus, with inorganic salts or in organic solvents (such as e.g., acetone, isopropyl alcohol, xylene, carbon tetrachloride, etc.), acid vat systems (vat dyes) and others. These processes have found some practical application. However, they present a number of technical and economical inconveniences, and so are gradually being replaced by more recent wet grinding methods, such as those involving the use of soluble or partially soluble inorganic salts or compounds, which methods produce adequate results as far as the reduction of the size of the dye particles is concerned: i.e., dimensions can be reached which are even lower than the solution limit of the optical microscope. In general, the inorganic compounds most commonly used in these processes are sodium chloride, boric acid, sodium tetraborate (deca- or penta-hydrate), or sodium or potassium sulphate, in a saturated aqueous solution of the same salt selected as the grinding means.

These last described processes also present some inconveniences, such as e.g., the difficult and long filtration of the pigment or of the dye in order to remove it from the residual mineral salt. For this reason, in order to facilitate the filtration it is often necessary to precipitate the dispersed pigment by flocculation in an acid medium co-activated by the addition of cationic compounds, filtration, careful washing and further redispersion of the pigment cake. This treatment is however only applicable to the insoluble organic pigments and dyes, which, by warm acid flocculation of their aqueous suspensions, do not lose or take again their dispersed form in a subsequent mixing with dispersants. If this separation of pigment or dye from mineral salt is not effectively carried out, pigments or dyes in the form of powder or paste very rich in electrolytes (even up to a content of 20%) are obtained, which represents in certain cases a limitation in the tinctorial concentration of the dye, quite apart from other possible disadvantages.

Accordingly, it is an object of this invention to provide an improved method for the wet grinding of dyes and pigments.

Another object is to provide an improvement in the wet grinding of dyes and pigments whereby the above described usual difficulties are substantially avoided.

Another object of this invention is to provide a process for preparing ultradispersed pastes or powders of water-insoluble organic pigments and dyes by wet grinding their aqueous suspensions.

We have made the surprising discovery that if, in the wet grinding of the dye, water insoluble, hydrophobic synthetic resins in the form of "pearls" are employed as grinding means, all the aforementioned inconveniences involved in the various wet grinding processes are virtually eliminated. Our process is characterized in that in the wet grinding we use small spheres made of hydrophobic synthetic resins, in amount from about 2 to 4 times the amount of the dry dye. These spheres function as grinding means and are recovered by filtration at the end of the treatment. The dye or pigment dispersions are then concentrated, in order to obtain a paste, or dried in order to obtain a powder, followed by the addition of dispersants and/or anti-fermentatives and fungicides as desired.

The size of the synthetic resin pearls used as grinding means may vary, depending on the mechanical agitation means used. The size of the pearls should preferably be from about 0.1 to 1 mm.

Resins that are suitable as grinding means in our invention include methyl methacrylate polymer, vinylchloride polymers and copolymers, styrene copolymers, divinylbenzene-acrylonitrile-methylacrylate copolymers, polyethylenes, polypropylenes, polyvinyl resins, polystyrenes, etc. In general, any resins are suitable whose characteristics comprise a good hardness coupled with a certain degree of elasticity which enables them to avoid being chipped or minced during grinding due to the impacts on (1) the fixed or mobile parts of the apparatus, (2) on each other, or (3) on the dye or pigment crystals. Such resins should be able to maintain this hardness in aqueous suspension in the cold and also up to at least 45–50° C. Such resins should also possess good resistance to water absorption, i.e., they should maintain their mechanical characteristics also in the presence of water.

The proportions of dry dye, grinding means, dispersants, and water (including that of paste) in the mixture may vary within wide limits depending on the desired end product, on the nature of the dye or pigment, on the dye or pigment particle size, and on the viscosity which the mass assumes during grinding. Ratios of dry dye-synthetic resin are preferably between about 1:2 and about 1:4.

Our process can be applied to all dyes and to the phthalocyanine pigments, whether metallized or not, to the corresponding halogenated derivatives, to vat dyes used as pigments or in the dyeing and printing of textiles, and to plastosoluble dyes. The use of synthetic resins as the grinding means, except for the case in which the pigment or the dye shows a swelling tendency during grinding, causes a high decrease in the water/dry dye ratio.

The addition of a dispersant to the paste often gives to the paste a fluidity sufficient for grinding, in which case, if necessary, dilution with water is carried out before filtration. The type of dispersant to be added to the pigment or to the dye paste before grinding depends on the tinctorial yield of the dye as it is, and on the tinctorial unit required in the end product as paste or powder.

The grinding is carried out in a vessel provided with means for vigorous agitation, which causes a virtually infinite series of impacts between the pigment or dye particles and the grinding means particles. The operations may be carried out in a suitable apparatus either batchwise or continuously.

The duration of the grinding time depends on the nature of the dye crystal subjected to the treatment (i.e. fragile or flexible), on the initial size (which may be from about 4 to 12 up to about 35 microns), and finally on the desired degree of fineness to be reached. In general, after a grinding period of three hours particles that are no longer visible at the threshold of visibility of the optical microscope are obtained. After one and a half hours of treatment some dyes reach the desired degree of fineness. In any event, during the course of treatment the microscopic observations enable one to observe the effect of the grinding on the dye particles. At the end of the grinding the mass is, if necessary, diluted with water, depending on the viscosity reached or on the desired concentration of the suspension. The resin is separated for instance by filtration on a suitable diaphragm under reduced pressure. The resin may be recycled for treatment of the same dye. The pH of the filtrate containing the dye is adjusted to the desired value, if necessary. At this point the dispersion is ready for use, or it may be concentrated and dried by the usual processes.

In accordance with our invention, pastes and powders of ultradispersed dyes are obtained in which the particles have the desired size and uniformity, thereby showing very good characteristics in filtration, chromatographic dispersion, and stability tests of the solution against fluocculation, even at the temperatures of their particular uses. The aqueous dispersions, due to their very high degree of division, present high limpidity. Several days or even weeks are required in order to observe the separation of some agglomerated mixtures in sedimentation tests.

The main advantages offered by the present invention in respect of the known wet grinding processes are:

(1) almost complete recovery of the grinding means due to their insolubility;

(2) easy and quick recovery of said means by simple decantation or quick filtration;

(3) immediate recycling;

(4) no abrasive or chemical wear of the grinding apparatus;

(5) no pollution of the dyes;

(6) avoidance of long and difficult filtrations of dispersed pastes to remove partially soluble grinding means (electrolytes);

(7) avoidance of the need to enrich the dispersed pastes and powders with mineral salt residues, the presence of which often causes or tends to cause some dispersed dyes to flocculate;

(8) the possibility of using the dye pastes directly as they are produced by our process;

(9) the obtaining of particles having such uniform and reduced size as to provide very good results with vat dyes in continuous dyeing operations, by pigmentation, in apparatus (i.e., where perfect and uniform penetration of the particles in the fabrics and yarn and a quick reduction of the dye are required);

(10) an improved regularity in the dyeing process with plasto-soluble dyes;

(11) advantages when working with pigments used for resins, rubber, paints, inks, etc., in that the particle size permits easy and regular dispersion in the carriers, as well as the possibility of reaching the optimum hiding power.

The following examples will further illustrate our invention and are not to be construed in a limiting sense. All parts are by weight unless otherwise indicated.

*Example 1*

200 g. of a paste of 16-17-dimethoxy-dibenzathrone containing 51 g. dry dye are added with 51 g. sodium ligninsulfonate. After mixing, 202 g. methyl methacrylate polymer are added. The mixture is subjected to grinding in a stirrer with a tip speed of 5–20 meters per second. The mass is so fluid that regular and complete agitation is reached. (Otherwise water is added until the required fluidity is obtained.) The outside of the vessel is water cooled so that the inner temperature does not exceed about 28–29° C. Mixing is continued at the same speed for about 3 hours using the microscope to control the final particle size obtained. The mass is then diluted and filtered. The filtrate may be used as it is as a paste and adjusted to the desired content, or it may be spray dried. The ultra dispersed paste or the powder redispersed in water, contain the dye in a colloidal dispersion with particles having a size of from about 0.1 to 0.5 micron.

*Example 2*

250 g. paste of 3,3'-dichloro-1,2'-1',2-dianthraquinone-dihydroazine containing 44 g. dry dye are mixed with 88 parts polyvinyl chloride or methyl methacrylate polymer and 44 parts of a dispersant, namely the condensation product of formaldehyde sodium beta-naphthalenesulfonate. The resulting paste is subjected to grinding as described in Example 1, but the grinding time is limited to 2 hours. The ultradispersed paste and powder consist of particles having sizes from about 0.2 to 0.5 micron and particles not visible under the optical microscope.

*Example 3*

250 g. 1:2-5:6-diphenyl-dithiazene-anthraquinone, containing 49 g. dry dye, are mixed with 49 g. sodium ligninsulfonate, and the obtained mixture is admixed with 98 g. methyl methacrylate polymer. Again agitation for 2 hours, the mixture is treated as described in Example 1. The dye obtained primarily consists of particles not visible under the optical microscope and of particles of from about 0.5 to 1 micron.

*Example 4*

88 g. of a divinylbenzene acrylonitrile-methylacrylate copolymer are added to 200 g. of a paste of 16,17-dimethoxy-dibenzanthrone, containing 44 g. sodium ligninsulfonate. The proportions of the various polymers can be varied within wide limits. After grinding for 3 hours and then proceeding as described in Example 1, a dye is obtained consisting almost completely of some particles of less than 0.1 micron, other particles of from about 0.2 to 0.5 micron, and other particles of about 1 micron.

*Example 5*

42 g. sodium lignin-sulfonate are added to 200 g. paste of 3-chloro1:2'-1:2-dianthraquinone-dihydroazine, corresponding to 42 g. dry dye. The mixture thus fluidized is ground with 84 g. methyl methacrylate polymer. After grinding for 2 hours a dispersion of particles smaller than 1 micron is obtained.

*Example 6*

61 g. sodium lignin-sulfonate, 50 moles water, and 122 g. polystyrene or methyl methacrylate polymer are added to 100 g. nitroviolanthrone, containing 61 g. dry dye. After agitation for 2 hours the procedure as described in Example 1 is followed. The dye obtained consists substantially of particles having a size of 0.5–1 micron along with a small portion of particles of about 1.5 micron.

*Example 7*

74 g. methyl methacrylate polymer or polypropylene are added to 200 g. paste consisting of carbazolated 1.4'-dibenzoyl-diamino-4,1'-diantrimide containing 37 g. dry dye. After grinding for two hours an ultradispersed dye is obtained whose particles have sizes of from about 0.5 to 1 micron. This dispersion is filtered as described in Example 1. The filtrate may be used as it is or may be dried after the addition of suitable dispersants depending on the need and on the use.

*Example 8*

31 g. of the polymerization product of formaldehyde with sodium beta-naphthalene sulfonate and 62 g. methyl methacrylate polymer or divinylbenzene-acrylonitrile-methylacrylate copolymer (containing about 0.05 to 5% divinylbenzene, 5 to 95% acrylonitrile and 5 to 95% methylacrylate) are added to 250 g. benzanthrone paste containing 31 g. dry product. After grinding for 2 hours the product obtained is filtered and 1 g. sodium dibutyl-naphthalene sulfonate is added to the filtrate. After drying a dye with particles of substantially about 1 micron (a few of which range up to 1.5 microns) is obtained.

*Example 9*

200 g. paste of carbozolated 1.5'-dibenzoyl-diamino-5,1'-diantrimide containing 50 g. dry dye are ground with 50 g. sodium lignin-sulfonate and 100 g. methyl methacrylate polymer. After grinding for 2 hours a dye with most particles of from about 0.2 to 0.5 micron and a few particles of about 1 micron is obtained.

*Example 10*

150 g. paste of copper phthalocyanine, containing 25 g. dry pigment, are mixed with 8.5 g. of the polymerization product of alkylphenol with ethylene oxide, 75 g. divinylbenzene-acrylonitrile-methylacrylate copolymer (containing about 0.05 to 5% divinylbenzene, 5 to 95% acrylonitrile and 5 to 95% methylacrylate), and 40 cc. water. Fungicides and antifermentatives (0.02% sodium pentachlorophenate or 0.1% of a mixture consisting of 80% sodium o-phenylphenate and 20% pentachlorophenate) are added to this mixture. After grinding for 1 hour a dye having most particles of from 0.5 to 1 micron and a few of 1.5 microns is obtained.

*Example 11*

200 g. paste of 16,17 dimethoxy-dibenzanthrone, containing 51 g. dry dye, are ground with 5.1 g. triethanolaminate oleate, 102 g. divinylbenzene-acrylonitrile-methylacrylate copolymer (containing about 0.05 to 5% divinylbenzene, 5 to 95% acrylonitrile and 5 to 95% methylacrylate), and 350 cc. water. After grinding for 2 hours the mixture is filtered through a metal mesh sieve (13,000 mesh/cm.$^2$). The resin on the filter is washed with water while the filtrate is filtered again through a cloth. The cake is dried in an oven at 50–60° C. and is then sieved. The product obtained is suitable as pigment for paints.

*Example 12*

200 g. paste of 1-amino-2-methyl-anthraquinone, containing 53 g. dry dye, are ground for 2 hours with 52 g. of the condensation product from cresol, formaldehyde and sodium 2-naphthol sulfonate, 0.8 g. sodium benzyl sulfonylate, 0.8 g. sodium dibutyl-naphthalene sulfonate, and 100 g. methyl methacrylate polymer. The ground product thus obtained is treated as in Example 1. The ultradispersed dye consists of particles having sizes of from about 0.5 to 1 micron.

Having thus described our invention, what we desire to secure and claim by Letters Patent is:

1. A process for preparing ultradispersed pastes and powders of an organic material selected from the group consisting of water insoluble organic pigments and water-insoluble organic dyes, comprising subjecting an aqueous suspension of said water-insoluble organic material to grinding in contact with water-resistant synthetic resin granules as the grinding means.

2. The process of claim 1 wherein the size of the granules of the synthetic resin is from about 0.1 to about 1 millimeter.

3. The process of claim 1 wherein the dry dye-synthetic resin ratio by weight is from about 1:2 to about 1:4.

4. The process of claim 1 wherein methyl methacrylate polymer is used as the grinding means.

5. The process of claim 1 wherein polyvinyl chloride is used as the grinding means.

6. The process of claim 1 wherein polystyrene is used as the grinding means.

7. The process of claim 1 wherein polypropylene is used as the grinding means.

8. The process of claim 1 wherein a 0.05 to 0.5% divinylbenzene-5 to 95% acrylonitrile-5 to 95% methylacrylate copolymer is used as the grinding means.

9. The process of claim 1 wherein the dye which is ultradispersed is selected from the group consisting of organic dyes of the phthalocyanic series, metallized derivatives thereof and vat dyes.

10. The process of claim 1 wherein the grinding is carried out in the presence of a dispersant.

11. The process of claim 10 wherein the dispersant is selected from the group consisting of sodium lignin sulfonate, the condensation product of formaldehyde and sodium β-naphthalene-sulfonate, alkyl-phenol polymerized with ethylene oxide, triethanolamine oleate, and di-cresol-formaldehyde-sodium-2-naphthosulfonate.

12. The process of claim 1 wherein the grinding means are recovered at the end of the treatment and are then recycled.

13. The process of claim 1 wherein the dye which is ultradispersed is a plastosoluble dye.

References Cited in the file of this patent

UNITED STATES PATENTS

| | | |
|---|---|---|
| 2,649,382 | Vesce | Aug. 18, 1953 |
| 2,773,044 | Vesce | Dec. 4, 1956 |

FOREIGN PATENTS

| | | |
|---|---|---|
| 679,552 | Great Britain | Sept. 17, 1952 |
| 189,308 | Austria | Mar. 25, 1957 |
| 1,071,451 | Germany | Dec. 17, 1959 |

OTHER REFERENCES

Baker et al.: "The Roll Mill, Pebble Mill and Kneader as Pigment Dispersion Equipment," Official Digest, August 1951.